No. 700,970. Patented May 27, 1902.
J. D. McFARLAND, Jr.
ADJUSTABLE SPEED GEAR.
(Application filed Sept. 23, 1901.)
(No Model.)
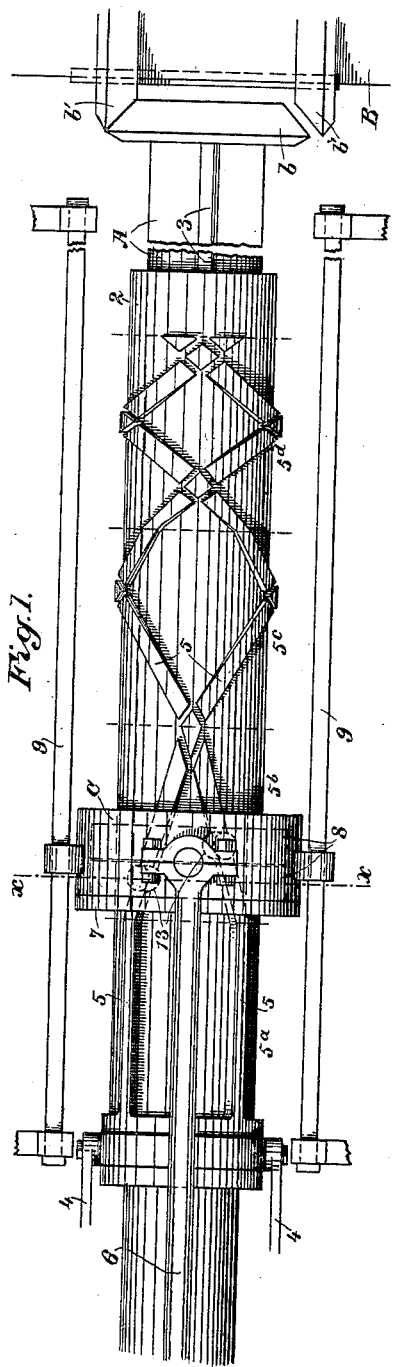
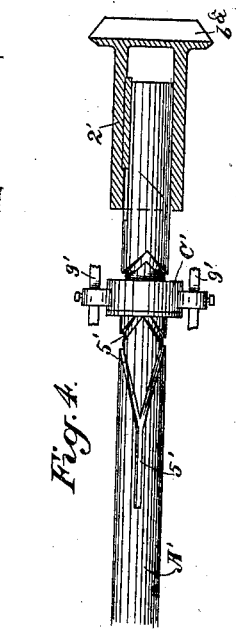
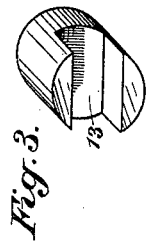
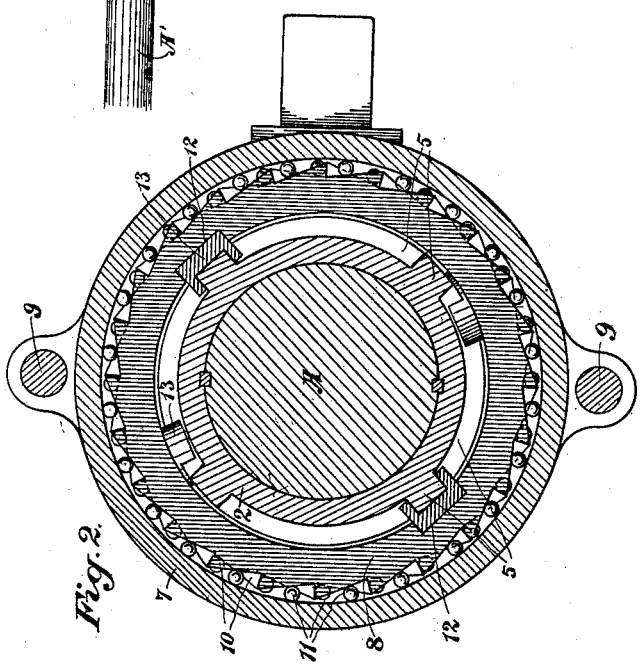
Witnesses,
Inventor,
James D. McFarland
By Dewey Strong
Atty.
THE NORRIS PETERS CO., PHOTO-LITHO., WASHINGTON, D. C.

UNITED STATES PATENT OFFICE.

JAMES D. McFARLAND, JR., OF SAN FRANCISCO, CALIFORNIA, ASSIGNOR OF ONE-HALF TO JOHN BRUCKMAN, OF SAN FRANCISCO, CALIFORNIA.

ADJUSTABLE SPEED-GEAR.

SPECIFICATION forming part of Letters Patent No. 700,970, dated May 27, 1902.

Application filed September 23, 1901. Serial No. 76,208. (No model.)

*To all whom it may concern:*

Be it known that I, JAMES D. McFARLAND, Jr., a citizen of the United States, residing in the city and county of San Francisco, State of California, have invented an Improvement in Adjustable Speed-Gears; and I hereby declare the following to be a full, clear, and exact description of the same.

My invention relates to improvements in devices by which a variable speed may be derived from a source of constant power. Its object is to provide a mechanism that is simple in construction and easy of manipulation, suitable for use in automobiles or wherever a change of speed is frequently necessary and wherein it is not desirable to depend on the engine to effect these changes.

It consists, essentially, of a shaft, a sleeve slidable longitudinally thereon, helical grooves or tongues varying in pitch upon the periphery of the sleeve, a clutch mechanism reciprocable upon the sleeve, means by which said clutch is adapted to engage the tongues or grooves on said sleeve and impart a rotary motion to the latter, and means whereby said sleeve may be shifted so as to bring any portion of said grooves or tongues into such engagement.

It also comprises details which will be more fully set forth hereinafter, having reference to the accompanying drawings, in which—

Figure 1 is a side view of the mechanism. Fig. 2 is a cross-section of the same on line *x x* of Fig. 1. Fig. 3 is a view of a channeled guide. Fig. 4 is a modification of the device.

A represents a shaft to which it is desired to impart a variable speed in one direction. From this shaft power may be transmitted, for example, to the axle B of an automobile by means of the bevel-gear *b*, meshing with the shifting or reverse gearing *b'*. A sleeve 2 is slidable in a feather 3 longitudinally upon the shaft. This sliding movement of the sleeve may be effected as by means of a forked lever 4. Upon the periphery of the sleeve are the helical tongues 5. The sleeve is devided by imaginary planes perpendicular to its axis into sections $5^a$ $5^b$ $5^c$ $5^d$, &c., said sections corresponding in length approximately to the stroke length of the clutch C, which is reciprocable upon the sleeve. Within each of these sections the pitch of the tongues is uniform, but varies in relation to the pitch in all the other sections—that is, the pitch of the tongues, *e. g.*, in the section $5^a$ at one end of the sleeve will be nothing—*i. e.*, the tongues will extend in a straight line. In the succeeding section $5^b$ the pitch may be twenty degrees, in $5^c$ forty degrees, $5^d$ sixty degrees, and so on, the line of the tongues, however, being continuous and the progression of increase or decrease being uniform. There are, in fact, two sets of these tongues, one winding to the right and one to the left about the sleeve.

C is a clutch inclosing the sleeve and adapted to be reciprocated by a prime mover, whereby a rectilinear movement of the clutch is converted into a rotary movement of the sleeve and shaft. The manner in which this is effected is as follows: The clutch C is secured to the rod 6, reciprocated from the prime mover, and consists of a frame 7, in which are the rotatable members 8. The clutch is prevented from turning by means of the guides 9. These members are of any suitable form, though I have shown here by way of preference two rings having notches 10 on their peripheries. The walls of these notches are pitched oppositely in the two rings. In the notches are balls 11, which are adapted to bind against the inner wall of the frame when one or the other of the rings is revolved in one way and to allow the ring to revolve freely in the frame when turned in the opposite direction. The difference of direction of pitch of the notches in the rings allows one ring to revolve freely while the other is locked against the frame. On the inner periphery of each ring are recesses 12, corresponding in number to one set of tongues on the sleeve. In each recess is revolubly socketed a channeled guide or pin 13, which is adapted to engage one of the tongues, so that when the rod 6 is reciprocated in one direction this slotted pin will by reason of the non-turning of the clutch C and the engagement of the balls by which the ring is made rigid with the clutch-frame cause the sleeve and shaft A to turn. When the rod reverses its movement, the clutch moves in the opposite direction, the balls release their grip, and the ring revolves freely within the frame and in unison with the sleeve and without retarding the latter. As the pins are loose in the sockets, they are able to turn and accommodate themselves to the sinuous line of the tongues, although the direction of travel of the pins is, like that of the clutch and rod, in a horizontal line. The pins in the other ring act similarly upon the other set of tongues, but on alternate reciprocations from the first, so that power is being applied to the sleeve continuously and at each reciprocation of the rod.

By means of the clutch-lever 4 the sleeve may be made to slide upon the shaft so as to bring any section $5^a$ $5^b$, &c., within the line of travel of the clutch. As each section has its tongues pitched to a certain relative speed, the revolution of the sleeve and axle will be faster or slower, according to this pitch or incline, while the speed of the prime mover remains constant. Thus, for example, when the clutch C is acting over the surface of section $5^b$ a speed, say, of two and one-half miles an hour would be indicated by the revolution of the sleeve and shaft. The section $5^c$ would indicate five miles per hour, section $5^d$ ten miles, &c., each section indicating a relative speed desired to be obtained. The section $5^a$ has its tongues horizontal for the purpose of allowing the sleeve and axle, and consequently the carriage which they may propel, to be brought to a standstill without stopping the engine.

The advantage of such a variable-speed mechanism is apparent where the motive power is an explosive-engine and wherein there is always a direct loss when it is attempted to obtain differences of speed in the drive-shaft by varying the speed of the engine. Furthermore, it is readily seen that the sleeve may be made to act as a brake, if desired.

While I have spoken of the helical guides on the sleeve as tongues and the pins 13 as being slotted, it is obvious that the relationship of these parts may be reversed, and the sleeve may have helical grooves, while the pins will be adapted to travel in these grooves, or, as in Fig. 4, the helical grooves $5'$ may be formed directly upon the shaft $A'$, which is made slidable on a feather in a sleeve $2'$, which latter carries the transmitting-gear $b^a$. Motion is imparted to the shaft by means of the clutch $C'$, as in the first instance.

Having thus described my invention, what I claim, and desire to secure by Letters Patent, is—

1. A driving mechanism comprising a shaft, a sleeve on said shaft, helical guides on said sleeve and of varying pitch, a clutch mechanism engaging said guides, and connections of said mechanism with a prime mover whereby the clutch is reciprocated to drive the sleeve and shaft.

2. In a driving mechanism, the combination of a shaft, a sleeve slidable thereon and turnable therewith, helical guides varying in pitch between their ends upon said sleeve, and a clutch mechanism engaging said guides and reciprocable in the line of the shaft.

3. In a driving mechanism, the combination of a shaft, a sleeve slidable thereon and turnable therewith, helical guides of varying pitch on said sleeve, part of said guides winding to the right and the remainder to the left about said sleeve, and a clutch mechanism engaging said guides and adapted to reciprocate in the line of the shaft.

4. In a driving mechanism, the combination of a shaft, a sleeve slidable thereon and turnable therewith, helical guides of varying pitch on said sleeve, a clutch mechanism reciprocable in the line of the shaft, said clutch having members engaging said guides, said members acting alternately to drive the sleeve and to revolve freely therewith, and means for shifting said sleeve within said clutch mechanism.

5. In a driving mechanism, the combination of a shaft, a sleeve slidable thereon and revoluble therewith, helical guides of varying pitch on said sleeve, a clutch mechanism inclosing said sleeve, and reciprocable thereon, means by which said clutch is prevented from turning, and connections between said clutch and guides whereby the sleeve and shaft are revolved.

6. In a driving mechanism, the combination of a shaft, a sleeve thereon, helical guides of varying pitch on said sleeve, a clutch inclosing and reciprocable upon said sleeve, means by which said clutch is prevented from turning, said clutch comprising rotatable members, pins socketed in said members, said pins adapted to engage the helical guides to drive the sleeve and shaft when the clutch is reciprocated.

7. In a driving mechanism, the combination of a shaft, a sleeve thereon, helical guides of varying pitch on said sleeve, a clutch inclosing and reciprocable upon said sleeve, said clutch comprising a frame, rotatable grip members in said frame, recesses on the inner periphery of said members, pins loosely socketed in said recesses, and said pins adapted to engage the helical guides to drive the sleeve and shaft.

8. In a driving mechanism, the combination of a shaft, a sleeve thereon, helical guides of varying pitch on said sleeve, a clutch inclosing and reciprocable upon said sleeve, means by which said clutch is prevented from turning, said clutch having grip members rotatable in opposite directions, and pins carried by said members and adapted to engage the helical guides to drive the sleeve when the clutch is reciprocated.

9. A driving mechanism consisting in combination of a shaft, a sleeve slidable thereon and revoluble therewith, helical guides on said sleeve, said guides having a uniform progressive variance in pitch between their ends, a clutch inclosing and reciprocable upon said sleeve, means by which said clutch is prevented from turning, rotatable grip members in said clutch and means upon said members for engaging said helical guides to drive the sleeve and shaft when the clutch is reciprocated, and means by which said sleeve may be moved upon the shaft to bring sections of said guides of greater or less pitch within the scope of the clutch.

10. A driving mechanism comprising a shaft, a sleeve thereon, said sleeve and shaft revoluble in unison, one of said members slidable in relation to the other, helical guides of varying pitch on said slidable member, and a reciprocable clutch mechanism engaging said guides.

In witness whereof I have hereunto set my hand.

JAMES D. McFARLAND, Jr.

Witnesses:
S. H. NOURSE,
JESSIE C. BRODIE.